Feb. 10, 1959 W. B. FASSBINDER 2,873,106
APPARATUS FOR WEIGHING LIVESTOCK
Filed June 20, 1957 2 Sheets-Sheet 1
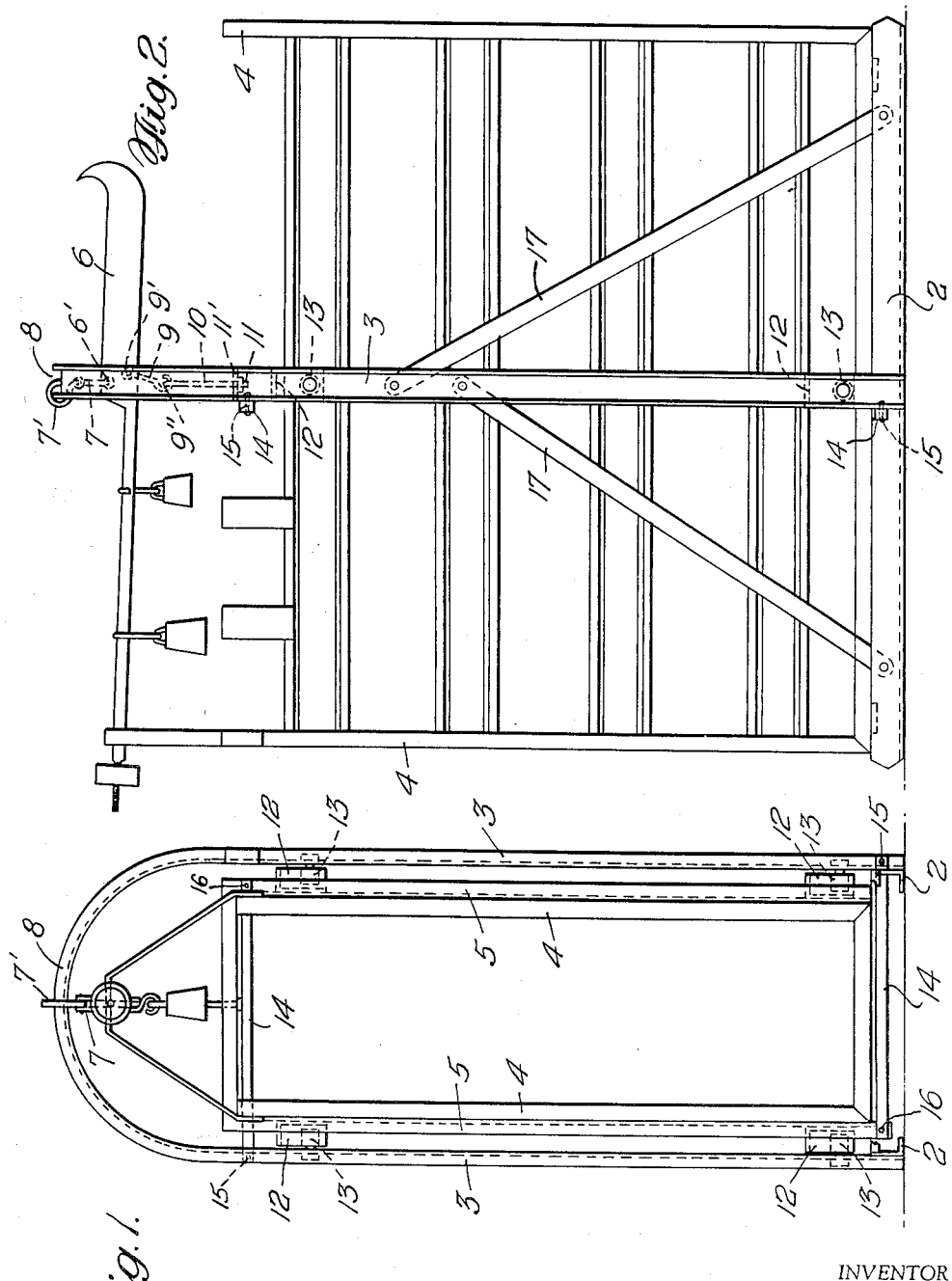
INVENTOR
W. B. Fassbinder
George M. Anderson.
BY
ATTORNEY

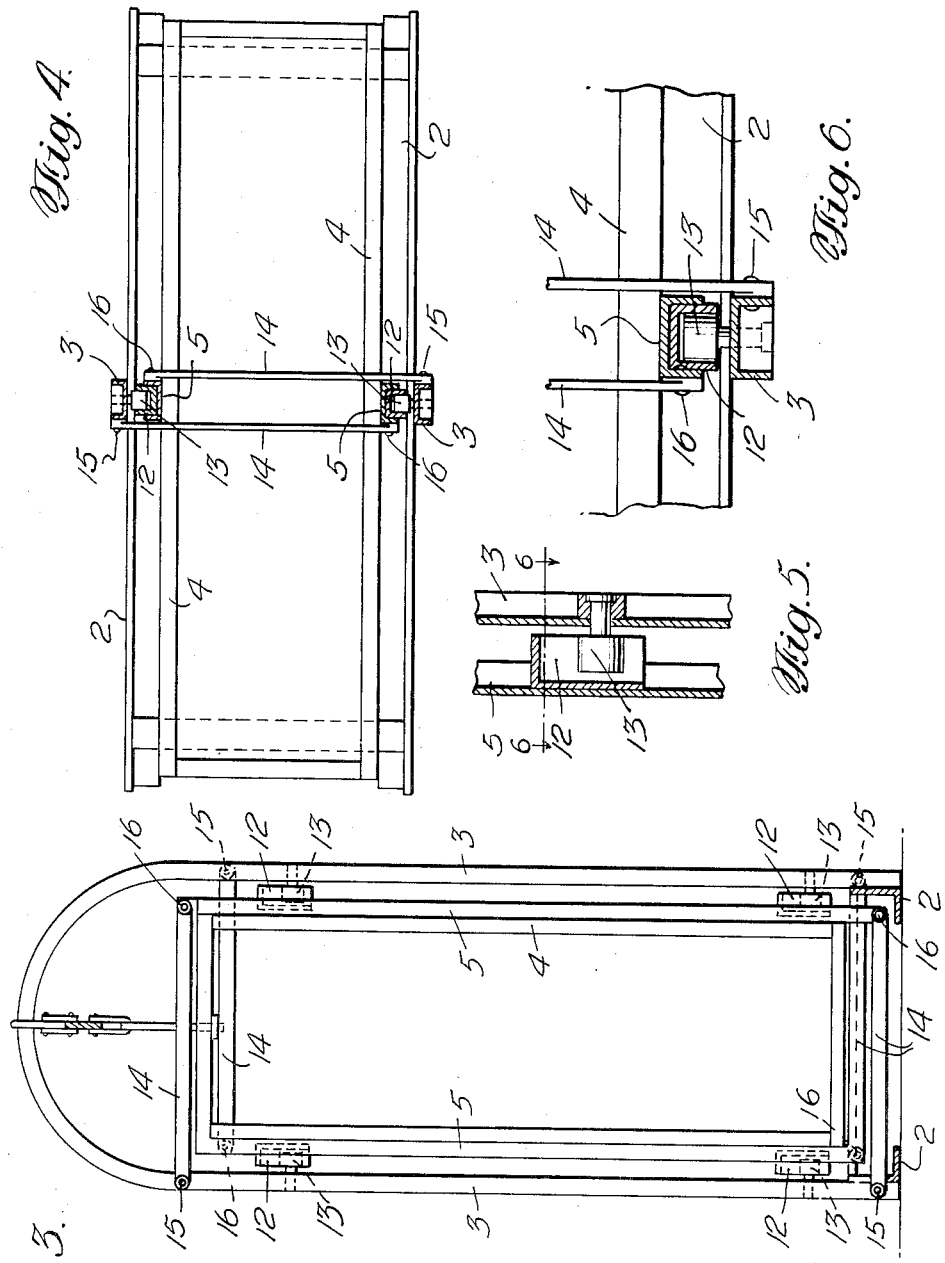

United States Patent Office 2,873,106
Patented Feb. 10, 1959

2,873,106

APPARATUS FOR WEIGHING LIVESTOCK

Werner B. Fassbinder, Elkader, Iowa

Application June 20, 1957, Serial No. 666,945

2 Claims. (Cl. 265—52)

The invention relates to apparatus for weighing livestock comprising a fixed frame having a horizontal base provided longitudinally centrally thereof with opposite vertical standards, a horizontal crate provided longitudinally centrally thereof with opposite posts located within and adjacent said standards, and weighing mechanism comprising a scale beam fulcrumed upon the fixed frame, said crate being pivotally connected with the scale beam and caused to rise in weighing an animal in the crate. This application is a continuation in part of the application Serial No. 531,330, filed August 30, 1955, entitled the same as this application.

An object of the invention is to provide such apparatus for weighing livestock with tilt preventing means between the crate and the fixed frame for simultaneously preventing both longitudinal and transverse crate tilting due to uneven distribution of the weight of the animal both longitudinally and transversely of the crate, in order that correct computation of the weight of the animal may be arrived at. For this purpose the scale beam must be balanced and stationary, whereas otherwise shift and uneven distribution of the weight of the restless, uneasy animal, which tends to be both longitudinally and transversely of the crate, will cause the scale beam to vibrate up and down and never come to a balanced stationary position. Other objects and advantages will appear hereinafter or will be obvious.

The invention consists in the novel construction and combination of parts as hereinafter set forth in the claims.

In the accompanying drawings,

Figure 1 is an end view of the invention.

Figure 2 is a side view of the same.

Figure 3 is an end view, taken from the opposite end, showing two pairs of upper and lower transverse stabilizer bars.

Figure 4 is a plan view taken below the scale beam, with the standards, the posts, and the tracks for the rollers in section, and the stabilizer bars as in Fig. 3.

Figure 5 is a detail fragmentary vertical sectional view of one of the rollers and its track on an enlarged scale.

Figure 6 is a section on the line 6—6, Fig. 5, with the stabilizer bars as in Fig. 4.

In the drawings, the fixed frame comprises a horizontal base 2 provided longitudinally centrally thereof with opposite vertical standards 3. A horizontal crate 4 rests upon said base and is provided longitudinally centrally thereof with opposite vertical posts 5 located within and adjacent said standards. The weighing mechanism comprises a scale beam 6 fulcrumed indirectly upon the fixed frame at 6' within perforations of a member 7 having an upper hook 7' pivotally engaging a perforation of the cross bar 8 connecting said standards at their upper ends. The crate 4 is pivotally connected to the scale beam by means of a member 9 within perforations of which the crate is adapted to become pivotally suspended at 9', said member 9 having a lower hook 9" pivotally engaging the upper eye of a rod 10 connected at 11 with the cross bar 11' connecting the posts 5 of the crate at their upper ends. The cross bar 11' of the crate is located below and spaced from the cross bar 8 of said standards. While the crate is shown as resting upon said base, it may be constantly suspended pivotally from the scale beam in known manner common to weighing scales.

Tilt preventing means are provided between the crate and the fixed frame for simultaneously preventing both longitudinal and transverse crate tilting due to uneven distribution of the weight of an animal both longitudinally and transversely of the crate in order that the correct weight of the animal may be arrived at, for which purpose the scale beam must be balanced and stationary, whereas otherwise shift of and uneven distribution of the weight of the restless uneasy animal which tends to be both longitudinally and transversely of the crate will cause the scale beam to vibrate up and down and never come to a balanced stationary position.

Said tilt preventing means comprises vertical tracks 12 mounted upon the upper and lower ends of the posts 5 of the crate, rollers 13 journaled in the upper and lower ends of the standards 3 of the fixed frame and working in said tracks for preventing longitudinal crate tilting, and transverse upper and lower parallel movement stabilizer bars 14 extending entirely across the crate, having horizontal pivotal connections 15 with the upper and lower ends of the standards 3 and horizontal pivotal connections 16 with the upper and lower ends of the posts 5 for preventing transverse crate tilting, said posts and said standards being common to said means for preventing longitudinal crate tilting and said means for preventing transverse crate tilting, said posts and said standards having maximum rigidity and minimum tendency to distort under said unevenly distributed weight.

The unevenly distributed weight of the heavy animal in the crate transmits a moving force to said stabilizer bars through the medium of said horizontal pivotal connections to cause said stabilizer bars to work in parallel in vertical planes for correct weight computation; whereas if said stabilizer bars should have vertical pivotal connections with said posts and said standards and work in parallel in horizontal planes, said weight would transmit a deterring force to said stabilizer bars through the medium of said vertical pivotal connections to deter said stabilizer bars from moving in parallel in horizontal planes and would tend to bend and distort said stabilizer bars, resulting in incorrect weight computation.

The upper and lower parallel movement transverse stabilizer bars 14 having horizontal pivotal connections 15 and 16 with the upper and lower ends of said posts and said standards balance each other in preventing transverse crate tilting under said weight.

Apparatus for correct weight computation is a precision apparatus and tendency to error defeats the object of the invention.

In Figs. 3 and 4, two pairs of transverse upper and lower parallel movement stabilizer bars are provided between the crate and the fixed frame.

The crate may be provided with any suitable end gates or closures one of which is opened to admit the animal to the crate and the other of which is opened for exit of the animal from the crate, both end gates being closed for confining the animal in the crate while being weighed. The fixed frame and the crate may be constructed in any suitable manner and have any suitable dimensions. The single scale beam shown may be substituted by scale beams having a compound leverage for weighing heavy animals in known manner. The standards 3 are braced at 17 to the base 2. The right is reserved to modifications coming within the scope of the claims.

I claim:

1. Apparatus for weighing livestock, comprising a fixed frame having a horizontal base provided with opposite vertically extending side portions, a generally horizontal crate disposed between said side portions, weighing mechanism comprising means fulcrumed on said fixed frame for weighing said crate, and stabilizing means comprising a pair of upper and lower generally horizontally disposed parallel movement transverse stabilizer bars, one bar of said pair of bars being pivotally connected at one of its ends to one side of said fixed frame and at its other end to the opposite side of the crate, the other bar of said pair of bars being similarly connected to the remaining sides of said fixed frame and said crate, whereby transverse crate tilting due to uneven weight distribution is prevented.

2. Apparatus for weighing livestock, as defined in claim 1, in which means are provided for preventing longitudinal crate tilting due to uneven distribution of the weight of an animal in the crate longitudinally of the crate, working in unison with said means for preventing transverse crate tilting, for simultaneously preventing both longitudinal and transverse crate tilting.

References Cited in the file of this patent

FOREIGN PATENTS

| | | |
|---|---|---|
| 427,347 | Great Britain | Apr. 23, 1935 |
| 729,225 | Great Britain | May 4, 1955 |